US008910249B2

(12) United States Patent
Rudolph

(10) Patent No.: US 8,910,249 B2
(45) Date of Patent: Dec. 9, 2014

(54) INTERFACE DEVICE FOR AN INTELLIGENT ELECTRONIC DEVICE AND METHOD OF OPERATING AN INTERFACE DEVICE

(75) Inventor: Thomas Rudolph, Rosbach v.d.H (DE)

(73) Assignee: Schneider Electric Energy GmbH, Frankfurt am Main (DE)

( * ) Notice: Subject to any disclaimer, the term of this patent is extended or adjusted under 35 U.S.C. 154(b) by 0 days.

(21) Appl. No.: 13/432,559

(22) Filed: Mar. 28, 2012

(65) Prior Publication Data
US 2012/0254952 A1 Oct. 4, 2012

(30) Foreign Application Priority Data

Mar. 29, 2011 (EP) .................................. 11160136

(51) Int. Cl.
G06F 21/20 (2006.01)
G06F 19/00 (2011.01)
H04K 1/00 (2006.01)
G01D 4/00 (2006.01)
G06F 7/00 (2006.01)

(52) U.S. Cl.
CPC .. H04K 1/00 (2013.01); G06F 7/00 (2013.01); G06F 19/00 (2013.01); Y04S 20/46 (2013.01); G01D 4/002 (2013.01); Y04S 20/32 (2013.01); Y02B 90/241 (2013.01)
USPC ............................................. 726/4; 709/208

(58) Field of Classification Search
CPC ............. H04K 1/00; G06F 7/00; G06F 19/00; G06F 16/15
USPC ............................................. 726/4; 709/208
See application file for complete search history.

(56) References Cited

U.S. PATENT DOCUMENTS

2002/0083172 A1 6/2002 Knowles et al.
2002/0091784 A1* 7/2002 Baker et al. ................... 709/208
2006/0161400 A1 7/2006 Kagan
2008/0046205 A1* 2/2008 Gilbert et al. ................... 702/62
2011/0054814 A1 3/2011 Kagan

FOREIGN PATENT DOCUMENTS

FR 2 865 064 7/2005
WO WO 2008/131781 A2 11/2008

OTHER PUBLICATIONS

Extended Search Report issued Aug. 30, 2011 in European Application No. 11160136.5.

* cited by examiner

Primary Examiner — Brandon Hoffman
Assistant Examiner — Samuel Ambaye
(74) Attorney, Agent, or Firm — Oblon, Spivak, McClelland, Maier & Neustadt, L.L.P.

(57) ABSTRACT

The present invention relates to a system comprising an interface device (100) for an intelligent electronic device (200), an intelligent electronic device (200) for substation automation and/or distribution automation and a security server (500), wherein said interface device (100) comprises a data interface (110) for establishing data communications with said intelligent electronic device (200), and a user interface (120) for exchanging data with a user (300) of said interface device (100), wherein said interface device (100) is configured to provide browser means (130) for accessing said intelligent electronic device (200) via said data interface (110), wherein the security server (500) is configured to check an authorization of the interface device (100) by access control means (520) and to control access of the interface device (100) to the intelligent electronic device (200).

19 Claims, 4 Drawing Sheets

100: interface device
110: data interface
120: user interface
130: browser means
132: graphical user interface
200: intelligent electronic device
300: user 100: interface device
110: data interface
120: user interface
130: browser means
132: graphical user interface
200: intelligent electronic device
300: user 100: interface device
102: casing
110: data interface
122: touch screen
132a: browser window
132b: arrangement of virtual control buttons
132c: virtual control button
132d: virtual control button

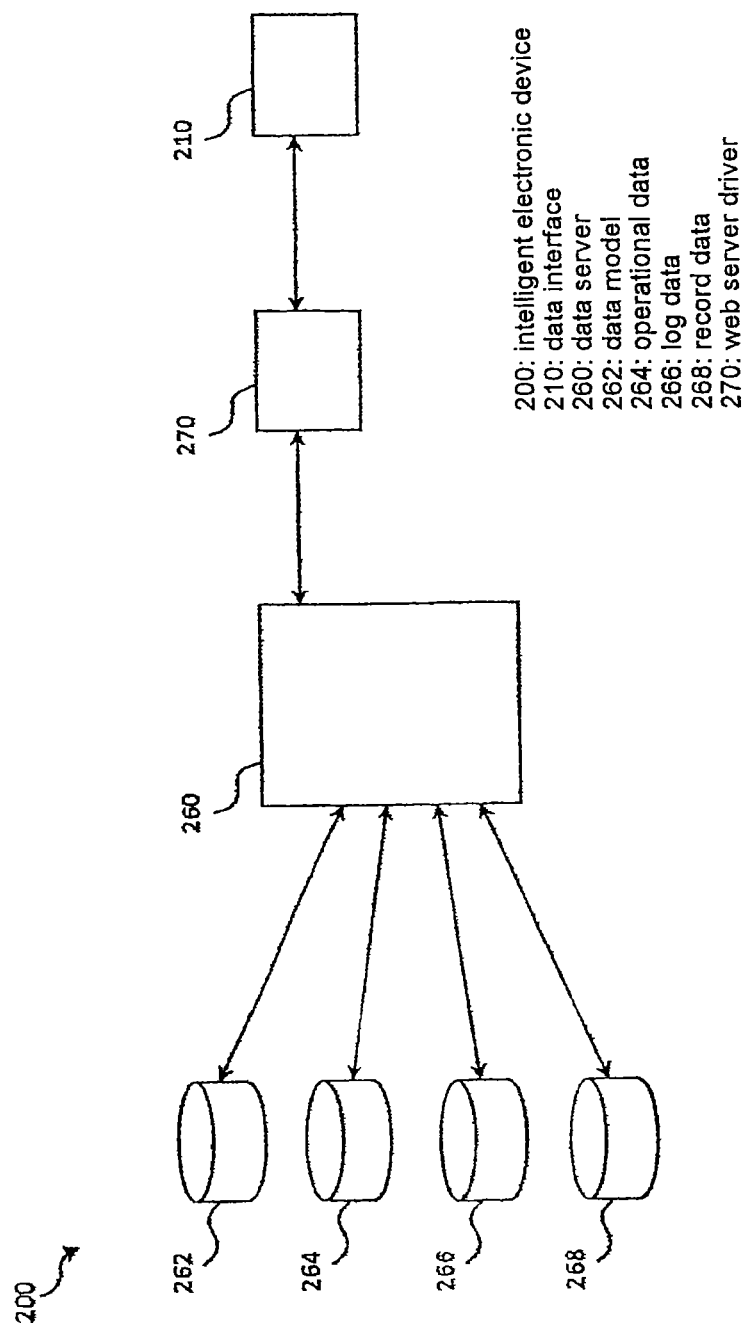

INTERFACE DEVICE FOR AN INTELLIGENT ELECTRONIC DEVICE AND METHOD OF OPERATING AN INTERFACE DEVICE

FIELD OF THE INVENTION

The invention relates to a system comprising an interface device for an intelligent electronic device, an intelligent electronic device for substation automation and/or distribution automation and a security server.

The invention further relates to a method of operating a system comprising an interface device for an intelligent electronic device, an intelligent electronic device for substation automation and/or distribution automation and a security server.

BACKGROUND

Intelligent electronic devices (IEDs) according to the International Electrotechnical Commission, IEC, 68150 standard, are e.g. used in the field of power systems. More specifically, IEDs may be used for substation or distribution automation. For example, IEDs may be implemented as protection and control devices ("protection and control IEDs") within a substation automation system (SAS) context or Remote Terminal Units (RTU) applied to distribution automation.

Conventional IEDs in the area of protection and control usually offer an integrated Human Machine Interface (HMI) comprising a small liquid crystal display which is fully integrated in the hardware and software structure of the IED thus strictly limiting an operational flexibility of the IED and its HMI.

In view of these disadvantages, it is an object of the present invention to provide an improved system comprising an interface device, particularly with an improved HMI, an intelligent electronic device for substation automation and/or distribution automation and a security server, and a method of operating a system comprising an interface device, an intelligent electronic device for substation automation and/or distribution automation and a security server, which offer an increased degree of operational flexibility and an increased degree of security.

SUMMARY

This object is achieved by a system according to claim 1. According to claim 1, the security server is configured to check the authorization of the interface device and to control access of the interface device to the intelligent electronic device.

The interface device of the system comprises a data interface for establishing data communications with said intelligent electronic device, and a user interface for exchanging data with a user of said interface device, wherein said interface device is configured to provide browser means for accessing said intelligent electronic device via said data interface.

The principal advantage of the interface device is its complete independence from technology and software evolutions of a specific IED. I.e., as long as various IEDs or types of IEDs, respectively, support data communications over the data interface of the interface device, a specific interface device may be used with a variety of supporting IEDs without substantial changes, if any, on the side of the interface device.

According to a preferred embodiment, said browser means are configured to interpret hypertext markup language, HTML, data which enables a particularly efficient browser-based access of the interface device to the IED.

According to a further preferred embodiment, said browser means are configured to read and/or modify data of said intelligent electronic device the interface device is connected to. Thus, manipulating data, even operational data, of specific IEDs is enabled by the interface device and no further interface is required at the IED for influencing its operational data.

According to a further preferred embodiment, said user interface of the interface device comprises a touch-sensitive display, which facilitates user interaction with the interface device and/or applications provided thereby, such as e.g. a browser application for accessing an IED connected to the interface device. Preferably, the interface device's user interface may only comprise a touch screen, without any dedicated pushbuttons and key elements beside as known from conventional interface devices for IEDs. Thus, a very high degree of operational flexibility is guaranteed, since IED- or application-specific elements of a user interface, such as e.g. pushbuttons, slide controls and the like may be emulated by the interface device by means of displaying respective controls on the touch screen.

According to a further preferred embodiment, said data interface comprises an Ethernet interface. Advantageously, the interface device may also be configured to receive electrical power over said data interface, e.g. said Ethernet interface.

According to a further particularly preferred embodiment, said interface device is a hand-held and/or a mobile device, wherein said interface device preferably comprises mounting means for at least temporarily attaching the interface device to an intelligent electronic device or a casing thereof. I.e., the interface device according to the embodiments is not required to be statically integrated into a specific IED and may thus advantageously be applied where necessary. However, on the other hand, the interface device may also comprise suitable mounting means by which it can at least temporarily be attached to an IED that is to be controlled and/or accessed by a user.

According to a further particularly preferred embodiment, said interface device is configured to provide different types of user interface functionalities and/or user interface styles to a user depending on a type of intelligent electronic device the interface device is connected to. In this context, the terms "user interface functionalities", "user interface styles" denote that the interface device may provide browser-based, e.g. HTML-coded, user interfaces which offer different layouts and/or functions to be selected by the user. Such different layouts may also be supported by the specific IEDs, i.e. by providing respective layouts of HTML pages or the style sheets used therefore. Thus, advantageously, a smooth migration from existing, dedicated interface devices may be provided in that the interface device of the inventive system may inter alia provide a user interface layout which resembles the design of the conventional interface devices. I.e., conventional user interface layouts and the like may advantageously be emulated by the interface device of the inventive system.

The intelligent electronic device of the inventive system may comprise a data interface for establishing data communications with an interface device, particularly an interface device according to the present embodiments. Said intelligent electronic device may comprise a data server that is configured to enable an interface device connected to said data interface to read and/or modify data of said intelligent electronic device.

According to a preferred embodiment, said data server comprises a web server that is configured to provide data in hypertext markup language, HTML, format for access, i.e. browsing and/or modification, by the interface device.

According to a further preferred embodiment, said data server is configured to modify at least one of a data model, operational data, logfile data, record data of the IED depending on instructions received from an interface device via the data interface. Thus, the IED of the inventive system may efficiently be controlled by the interface device according to the embodiments.

A further solution to the object of the present invention is given by a method of operating a system comprising an interface device, an intelligent electronic device and a security server according to claim 14. According to claim 14, the security server checks an authorization of the interface device by access control means and controls access of the interface device to the intelligent electronic device.

The interface device comprises a data interface for establishing data communications with said intelligent electronic device, and a user interface for exchanging data with a user of said interface device, wherein said interface device provides browser means for accessing said intelligent electronic device via said data interface.

The intelligent electronic device used in the inventive method may comprise a data interface for establishing data communications with the interface device, wherein said intelligent electronic device comprises a data server that enables an interface device connected to said data interface to read and/or modify data of said intelligent electronic device.

Further advantageous embodiments are given by the dependent claims.

BRIEF DESCRIPTION OF THE FIGURES

Further aspects, features and embodiments of the present invention are given in the following detailed description with reference to the drawings, in which:

FIG. 5 depicts a simplified block diagram of components of an intelligent electronic device.

DETAILED DESCRIPTION

Figure 1:
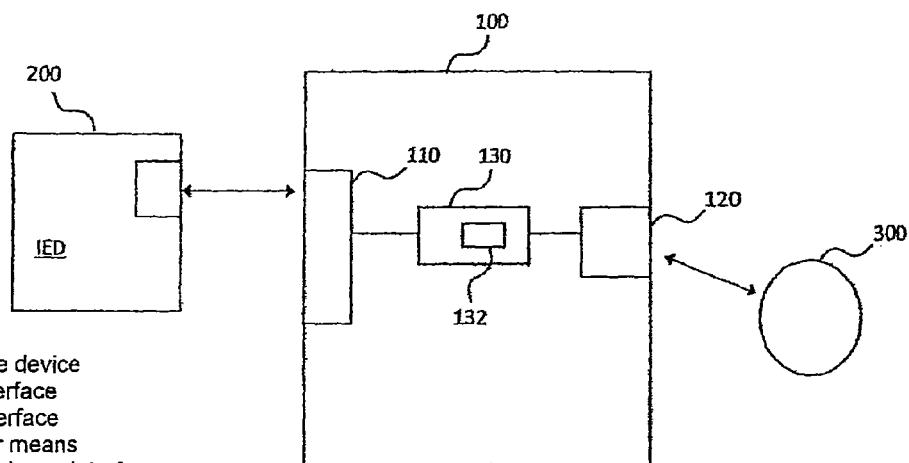
FIG. 1 depicts a schematic block diagram of an interface device.

FIG. 1 depicts a schematic block diagram of an interface device 100. The interface device 100 comprises a data interface 110 for establishing data communications with an intelligent electronic device 200, for instance an IED according to the IEC 68150 standard which may e.g. be used as a protection and/or control device within a substation automation system.

The interface device 100 further comprises a user interface 120 for exchanging data with a user 300 of said interface device 100, whereby the user 300 can gain access to the IED 200 via the interface device 100.

For facilitating efficient access to the IED 200, which is particularly independent of a specific technical configuration and/or a product version of the IED 200, the interface device 100 is configured to provide browser means 130 for accessing said intelligent electronic device 200 via said data interface 110. According to a particularly preferred embodiment, the browser means 130 are configured to interpret hypertext markup language (HTML) data or comparable data formats such as XML (extensible markup language).

For instance, the browser means 130 implemented within the interface device 100 may comprise a functionality that is comparable to that one of a conventional web browser such as the Internet Explorer or Firefox, whereby the interface device 100 offers efficient and standardized access to IEDs 200 supporting such browser means 130. To support the interface device 100, an IED 200 according to the embodiments may comprise a web server that provides relevant data in the HTML or XML format for access by the browser means 130 of the interface device 100.

According to the complexity of information, different communication protocols like HTTP or webservices (SOAP) might be applied.

Data so retrieved by the interface device 100 from the IED 200 may be presented to the user 300 of the interface device 100 by means of a graphical user interface 132 that is implemented in the interface device 100.

Figure 2:
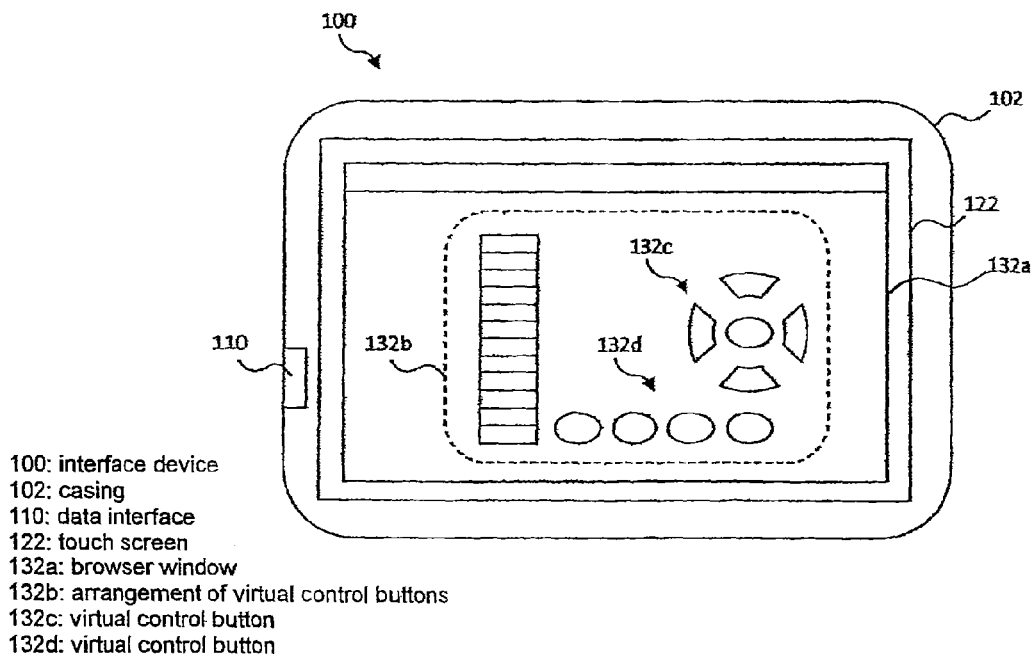
FIG. 2 depicts a schematic front view of a further interface device.

For example, the graphical user interface 132 may be presented to the user 300 by means of a touch screen, i.e. a touch sensitive display device, cf. the front view of an exemplary interface device 100 according to FIG. 2. As can be seen from FIG. 2, the interface device 100 is equipped with a touch screen 122, which defines a visual component of the user interface 120.

Optionally, acoustic and/or kinaesthetic (e.g., force feedback, vibration) signaling means may also be provided.

According to a preferred embodiment, the interface device's user interface may only comprise said touch screen 122, without any dedicated pushbuttons and key elements beside as known from conventional interface devices for IEDs. Thus, a very high degree of operational flexibility is guaranteed, since IED- or application-specific elements of the user interface 120, such as e.g. push-buttons, slide controls and the like may be emulated by the interface device 100 by means of displaying respective controls on the touch screen 122. Preferably, the touch screen 122 is designed such that it nearly covers the whole front surface of the interface device 100 or its casing 102, respectively, to enable a maximum of information to be displayed to the user 300 in a clear and easily comprehensible manner.

According to the present embodiment depicted by FIG. 2, the interface device 100 displays on its touch screen 122 a browser window 132a as implemented by the browser means 130. The browser window 132a comprises an arrangement 132b of virtual control buttons 132c, i.e. cursor buttons, and 132d, as well as of information display fields, which is specific to the IED 200 (FIG. 1) the interface device 100 is currently connected to. Thus, the control of the TED 200 by means of the interface device 100 is particularly easy due to its customization regarding the type and/or product version of the TED 200.

Advantageously, the interface device 100 may be configured to provide different types of user interface functionalities and/or user interface styles to the user 300 in the form of the graphical user interface 132 depending on a type of intelligent electronic device 200 the interface device 100 is connected to. Definitions for such specific interface functionalities and/or styles of presentation may e.g. be stored within the interface device 100, the IED 200 to be accessed, or at a further network element that is at least temporarily accessible by the interface device 100.

Preferably, the interface device 100 is a hand-held and/or mobile device whereby a multitude of different IEDs 200 at different locations can be accessed via said interface device 100. For this purpose, only a respective data connection between the interface device 100 and a specific IED 200 has to be established via the data interface 110, which may e.g. be an Ethernet interface. Advantageously, according to an embodiment, the interface device 100 may be configured to also receive electrical power over said data interface 110 in addition to the data connection. Thus, e.g. a power over Ethernet (PoE) configuration may be implemented. In such cases, the interface device 100 would not require integrated electrical energy storage such as batteries, since it may receive the electrical energy required for its operation from the target IED 200 it is connected to. However, according to a further embodiment, the interface device 100 may also comprise integrated batteries (not shown) which even further increase the mobility of the device 100.

To further increase the flexibility of operation of the interface device 100, according to a further embodiment, mounting means may be provided at the casing 102 (FIG. 2) of the interface device 100 for at least temporarily attaching the interface device 100 to an IED 200. Thus, the interface device 100 may advantageously replace conventional interface devices which are monolithically integrated in conventional IEDs. However, if required, the detachable mobile interface device 100 according to an embodiment may be removed from a specific first IED for use with a further IED at another location.

According to a further advantageous embodiment, the browser means 130 of the interface device 100 are configured to read and/or modify data of an IED 200 the interface device 100 is connected to. Thus, a user 300 of the interface device 100 may not only retrieve data from an IED 200, e.g. for controlling operational parameters of the IED 200. The user rather also has the possibility of influencing operational parameters and further data of the IED 200 by means of the interface device 100.

Figure 3:
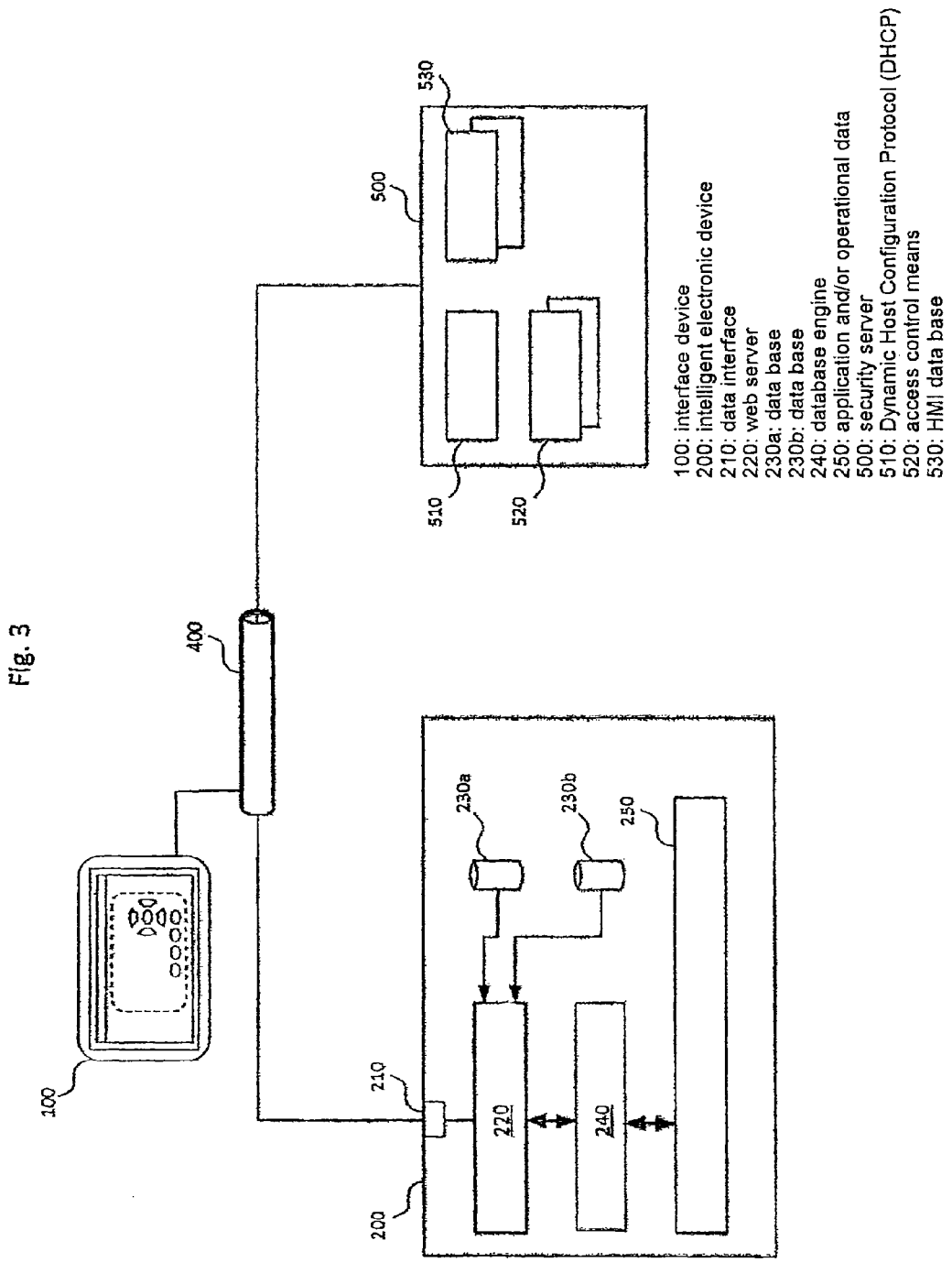
FIG. 3 depicts a schematic block diagram of a communications scenario according to an embodiment.

FIG. 3 depicts a schematic block diagram of a communications scenario according to an embodiment. An interface device 100 is connected via its data interface 110 (FIG. 1), which may e.g. be an Ethernet interface, to a network 400 such as an intranet of an operator of a substation automation system.

Additionally, FIG. 3 illustrates an internal architecture of an IED 200, which is configured to operate together with the interface device 100 according to the embodiments. The IED 200 is also connected to the network 400 via its data interface 210.

For providing operational data of the IED 200 and further data processed by the IED 200 to the interface device 100 in a format that can be retrieved and/or processed by the browser means 130 (FIG. 1), the IED 200 comprises a web server 220 (FIG. 3), which is configured to provide HTML and/or XML data.

The Web Server 220 may preferably be configured to provide active HTML/Web content, e.g. based on specific style sheet definitions (.css files), which may be provided by a local style definition database 230a. Thus, the IED 200 may provide individual user interface styles and e.g. styles that define how data of the IED 200 is to be presented to a user 300 of the interface device 100 by its browser means 130. As an advantage, each IED 200 may comprise its own functionality and/or style definitions which influence the presentation of the IED's data to the user 300 of the interface device 100. Furthermore, the IED 200 may also comprise a local content definition database 230b, wherein e.g. *.php files may be stored that comprise content definitions related to the IED 200. Although local databases 230a, 230b for the style sheet definitions and content definitions are preferred, alternative or additionally, remote databases can be employed for providing respective information.

To increase an overall security of the network 400, the content offered by the Web Server 220 of the IED 200 only becomes accessible for the interface device 100 by authorisation from a security server 500 that is also connected to the network 400.

According to a further embodiment, the security server 500 is also configured to provide dynamic IP addresses to interface devices 100 that are connected to the network 400, for example via DHCP (Dynamic Host Configuration Protocol) 510, wherein the network 400 is preferably of the Ethernet type. As an alternative, the dynamic assignment of IP addresses using IPV6 might be applied. The security server 500 is configured to check an authorisation of the interface device 100 by access control means 520.

To enable a direct access to all relevant data of the IED 200 via a connected interface device 100, application and/or operational data 250 of the IED 200 is provided to an interface database engine 240, which is configured to transform the application and/or operational data 250 of the IED 200 into a form suitable for presentation by the web server 220 and which can forward said transformed data to the web server 220.

For instance, application data 250 may comprise LED status information, the state of pushbuttons, a mimic diagram, measurements and further data specific to the respective IED 200 and its application.

If the security server 500 grants access of the interface device 100 to the IED 200, according to a preferred embodiment, the IED's web server 220 will transmit data to the browser means 130 of the interface device 100 which cause the browser means 130 to display an initial human machine interface (HMI) screen on the touch screen 122 (FIG. 2) of the interface device 100. The initial HMI screen may e.g. comprise predetermined data specifically related to the IED 200, such as e.g. type and/or version information of the IED 200. Further, the initial HMI screen for display on the touch screen 122 of the interface device 100 may be configured such that it can give access to the web server 220 of the IED 200, e.g. by providing related links or hyperlinks.

I.e., an IED 200 according to the present invention may provide the abovementioned initial HMI screen to enable a user 300 of the interface device 100 to "log in" to the IED 200 or its web server 220, respectively.

The above explained procedure advantageously enables an interface device 100 to arbitrarily access a wide variety of different IEDs 200 under security control of the security server 500. After authenticating an interface device 100, the security server 500 advantageously redirects the browser means 130 to the initial HMI screen of the respective IED 200, whereby a central authentication is enabled and corresponding security measures on the IED level can be avoided.

According to a further particularly preferred embodiment, instead of locally providing initial HMI screen data within the various IEDs 200, or possibly within specific interface devices 100, initial HMI screen data for one or more IEDs 200 may also advantageously be provided within the security server 500 or another central server, preferably in form of a HMI data base 530. Thus, only the HMI data base 530 of the security server 500 has to be maintained for ensuring proper initial HMI screen display to an initially connected interface device 100.

According to a further embodiment, an IED 200 may also be configured to authenticate an interface device 100 and/or a user 300 thereof prior to granting access to its web server 220.

Advantageously, as is schematically depicted by FIG. 5, an intelligent electronic device 200 comprises a data server 260 that is configured to enable an interface device 100 (FIG. 1) connected to the IED 200 via its data interface 210 to read and/or modify data of said IED 200. Thus, a full control of the IED 200 is enabled by means of the interface device 100.

For example, an IED 200 may comprise a data model 262, and/or operational data 264, and/or log data 266, and/or record data 268, each of which may be stored in a dedicated database as exemplarily indicated by FIG. 5 or together with other types of data. The contents of the respective data 262, 264, 266, 268 depends on the specific type of IED 200 and its implemented applications. E.g., a control IED for a substation will comprise other data, particularly other operational data, than a PQ concentrator IED which is used to collect power quality information from several devices such as merging units distributed over a substation automation system.

Nevertheless, the configuration of the IED 200 and its data server 260, which can communicate with the web server 220 (FIG. 3) by means of a web server driver 270 (FIG. 5), advantageously enables to manipulate data 262, 264, 266, 268 of the IED 200 from a remote location or at the same location as the IED 200 by means of an interface device 100 connected to said IED 200.

Figure 4:
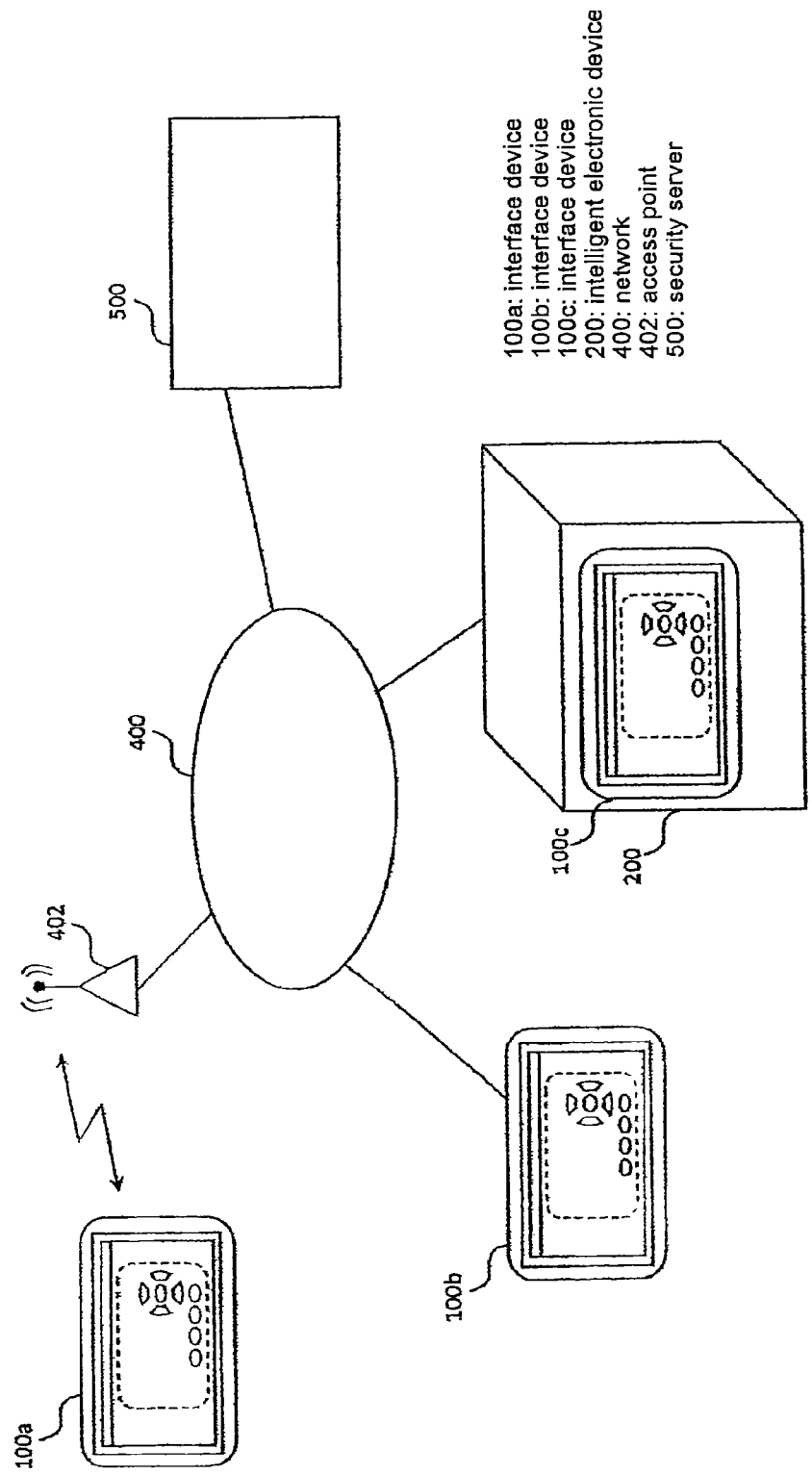
FIG. 4 depicts a further scenario according to the embodiments.

FIG. 4 depicts another operational scenario involving a plurality of interface devices according to the embodiments.

Centrally within FIG. 4 a network, preferably of the Ethernet type, is depicted to which a first interface device 100a is connected. The first interface device 100a comprises a wireless network interface, e.g. of the WLAN type, and communicates over a respective wireless channel with an access point 402 that is connected to the network 400. Thus, the first interface device 100a can be moved around freely, e.g. in the sense of a mobile device, while at the same time enabling access to an IED 200 connected to the network 400.

FIG. 4 depicts a further interface device 100b which comprises a cabled Ethernet connection to the network 400.

A further interface device 100c according to the embodiments is also depicted in its mounting state at an IED 200. Thus, as already explained above, the interface device 100c may replace a conventional interface device of the IED 200. However, in those cases where the IED 200 is not required to be equipped with the interface device 100c, it can be detached from the IED 200 and can be used to access a further IED (not shown).

A security server 500 is also depicted by FIG. 4.

According to a particularly preferred embodiment, the interface device 100 is a handheld mobile device comprising a touch screen 122 (FIG. 2), preferably without any dedicated pushbuttons and key elements beside. The data link between IED(s) 200 and the interface device 100 may be based on Ethernet using a web browser 130 (FIG. 1) to communicate, and the interface device 100 may be powered by PoE (Power over Ethernet) for example in fixed mounted applications, where the interface device 100 is attached to an IED 200 (FIG. 4). For hand-held operation, WLAN data communications with an IED 200 and/or network 400 and battery operation may be provided.

Providing the browser means 130 according to the embodiments enables several advantages: the interface device 100 is independent from technology and software evolutions on the IED 200 and does not require extended settings/configurations besides e.g. a generic HTML start page with related links to the IEDs 200. This start page might be stored on the interface device 100 or may be downloaded from a default server, e.g. within a substation where several IEDs are located. This enables the capability to use such an interface device 100 in different substations in a free manner without any reconfiguration. Look and feel is depending on the IED-based style guides (cf. data bases 230a, 230b of FIG. 3) which might be modified by the user depending on the capabilities of the IED 200 itself. Advantageously, it is possible to emulate previous generation of IEDs by applying specific style guides. This enables smooth transition in0. refurbishment over a couple of years and helps to reduce Life-cycle-cost (LCC). Further advantages are the possibility of free access from the interface device 100 to a documentation database stored on an IED 200 itself, a substation based server (not shown) or a central server within the operator's network and/or the Internet, if accessible.

Controlling the entire operation of the interface device 100 by touch screen 122 enables very compact design which allows free allocation/mounting of the interface device 100 in medium voltage (MV) bays as well as in high voltage (HV) cubicles. Due to the proposed separation of IED 200 and interface device 100, it further becomes possible to apply ruggedized hardware for the IED 200 (indoor and outdoor applications) without limitations given by LCDs as provided by conventional interface devices which are fixed to a specific IED.

The invention claimed is:

1. A system comprising:
   an intelligent electronic device for at least one of substation automation and distribution automation;
   an interface device to interface said intelligent electronic device; and
   a security server to communicate with the interface device and the intelligent electronic device via a network, wherein
   said interface device comprises a data interface to establish data communications with said intelligent electronic device, and a user interface to accept and respond to user input from a user of said interface device,
   said interface device is to provide a browser to access said intelligent electronic device via said data interface,
   said interface device is configured to provide at least one of different types of user interface functionalities and user interface styles to a user depending on a type of intelligent electronic device the interface device is connected to,
   the security server is to check an authorization of the interface device by an access controller and to control access of the interface device to the intelligent electronic device, and
   after the security server authenticates the interface device, the data communications between the interface device and the intelligent electronic device are not performed through the security server.

2. A system according to claim 1, wherein the security server is configured to provide a dynamic IP address to the interface device.

3. A system according to claim 1, wherein the security server is adapted, after authenticating the interface device, to redirect the browser of the interface device to an initial Human Machine Interface screen of the intelligent electronic device.

4. A system according to claim 1, wherein said browser is to interpret at least one of hypertext markup language, HTML data, and extensible markup language, XML, data.

5. A system according to claim 1, wherein said browser is to execute at least one of read and modify data of said intelligent electronic device the interface device is connected to.

6. A system according to claim 1, wherein said user interface comprises a touch-sensitive display.

7. A system according to claim 1, wherein said data interface comprises an Ethernet interface.

8. A system according to claim 7, wherein said interface device is configured to receive electrical power over said data interface.

9. A system according to claim 1, wherein said interface device is at least one of a hand-held device and a mobile device.

10. A system according to claim 9, wherein said interface device comprises mounting means for at least temporarily attaching the interface device to an intelligent electronic device.

11. A system according to claim 1, wherein the intelligent electronic device comprises a data interface for establishing data communications with the interface device, said intelligent electronic device further comprising a data server to enable the interface device to execute at least one of read and modify data of said intelligent electronic device, when the interface device is connected to said data interface.

12. A system according to claim 11, wherein said data server comprises a web server to provide data in hypertext markup language, HTML, format.

13. A system according to claim 11, wherein said data server is to modify at least one of a data model, operational data, logfile data, and record data depending on instructions received from the interface device via the data interface of the intelligent electronic device.

14. A method of operating a system, comprising:
automating, by an intelligent electronic device, at least one of substation automation and distribution automation;
establishing data communications, by a data interface provided on an interface device for said intelligent electronic device, with said intelligent electronic device;
accepting and responding, by a user interface provided on said interface device, to user input from a user of said interface device;
accessing, by a browser of said interface device, said intelligent electronic device via said data interface;
checking an authorization, by a security server in communication with said interface device and said intelligent electronic device via a network, of the interface device by an access controller;
controlling access, by the security server, of the interface device to the intelligent electronic device;
after the security server authenticates the interface device, performing the data communications between the interface device and the intelligent electronic device without the security server; and
providing at least one of different types of user interface functionalities and user interface styles to a user depending on a type of intelligent electronic device the interface device is connected to.

15. A method according to claim 14, further comprising:
providing a dynamic IP address to the interface device by the security server.

16. A method according to claim 14, further comprising:
redirecting the browser of the interface device, by the security server, to an initial Human Machine Interface screen of the intelligent electronic device after authenticating the interface device.

17. A method according to claim 14, further comprising:
providing, by said interface device, at least one of different types of user interface functionalities and user interface styles to a user depending on a type of intelligent electronic device the interface device is connected to.

18. A method according to claim 14, further comprising:
enabling the interface device, by a data server on said intelligent electronic device, to execute at least one of read and modify data of said intelligent electronic device, when the interface device is connected to said data interface.

19. A method according to claim 18, further comprising:
modifying, by the data server of said intelligent electronic device, at least one of a data model, operational data, logfile data, and record data depending on instructions received from the interface device.

* * * * *